April 1, 1924.
J. R. BIRCH
1,488,903
DRYING AND CONDITIONING MACHINE FOR CEREALS
Filed Dec. 19, 1923
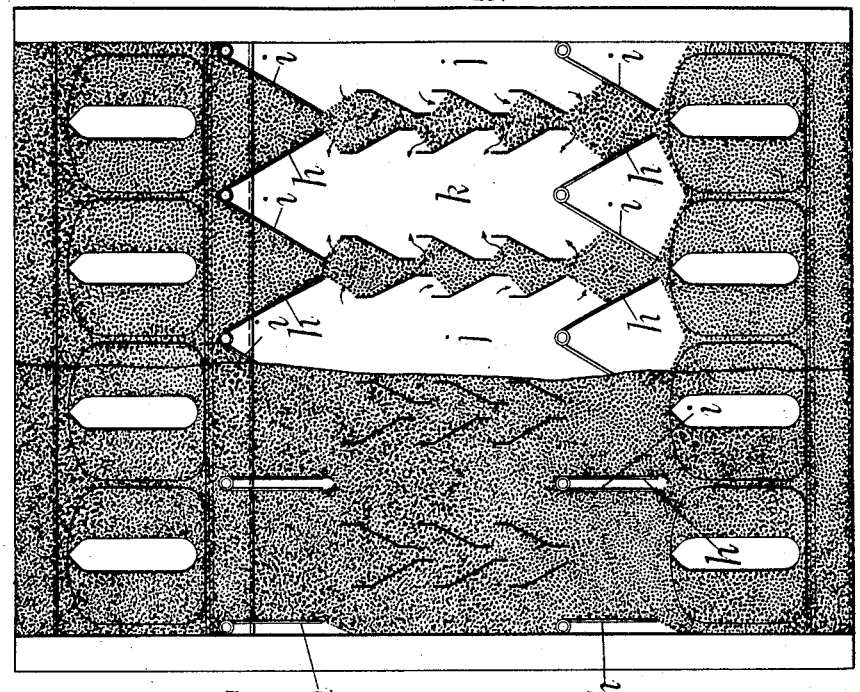
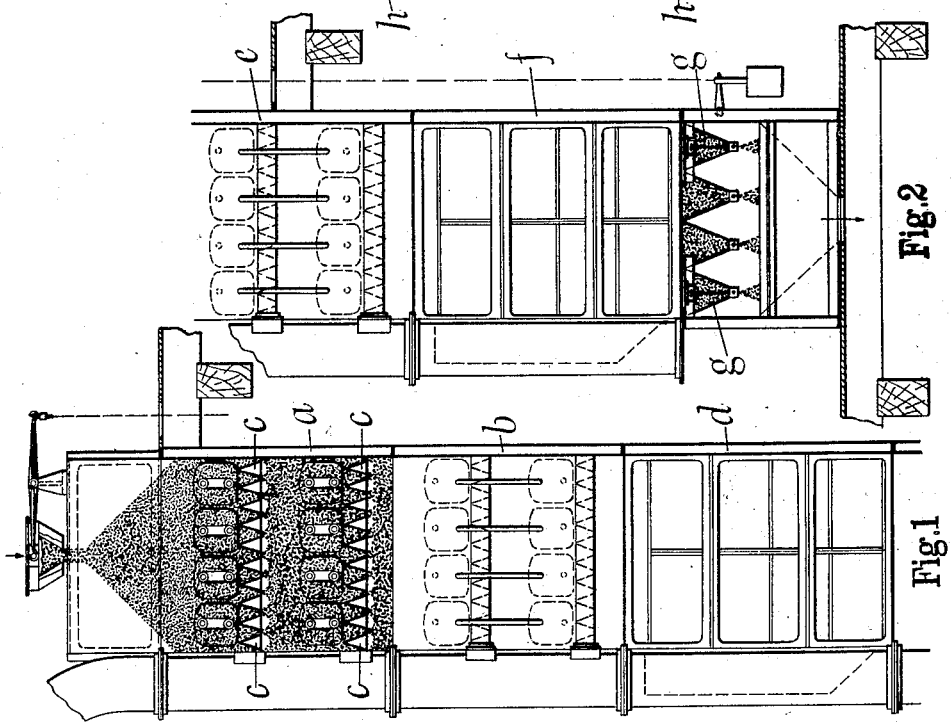
Fig.3
Fig.2
Fig.1
Inventor
J. R. Birch
By Marks & Clerk Attys Patented Apr. 1, 1924.

1,488,903

UNITED STATES PATENT OFFICE.

JAMES RAGLAND BIRCH, OF MANCHESTER, ENGLAND.

DRYING AND CONDITIONING MACHINE FOR CEREALS.

Application filed December 19, 1923. Serial No. 681,631.

*To all whom it may concern:*

Be it known that I, JAMES RAGLAND BIRCH, subject of the King of Great Britain and Ireland, and resident of 20 Mount Street, Manchester, England, have invented certain new and useful Improvements in Drying and Conditioning Machines for Cereals, of which the following is a specification.

This invention relates more particularly to machines for drying and conditioning wheat of the type wherein the wheat, in its passage through the machine, is subjected to alternate heating and aspirating or drying treatments in two or more stages. Thus, the wheat entering the machine is heated to the desired temperature in a heating section, and then subjected to the action of either hot or cold air currents in a lower aspirating or drying section, whereby the moisture in the wheat is partially evaporated.

The object of this invention, which comprises the arrangement and combination of parts hereinafter described and claimed, has for its object to provide a machine of the said type readily adaptable for dealing efficiently with both soft wet and hard dry wheats.

Referring to the two accompanying sheets of explanatory drawings:—

Figures 1 and 2 taken together illustrate a conditioning machine for cereals constructed in accordance with my invention, Figure 1 illustrating the upper and Figure 2 the lower portion of the machine.

Figure 3 is a sectional view showing an aspirating or drying section of the conditioning machine, the left-hand side of the figure showing the position of the parts and the path of the cereal when the aspirating or drying action is not required.

The same reference letters in the different views indicate the same parts.

The machine illustrated comprises two heating sections $a$, $b$ at its upper end; moist air can be exhausted from the said sections through the air ducts $c$ in the known manner. Beneath the heating section $b$ is placed an aspirating section $d$ in which air is circulated through the cereal to dry the same by carrying off moisture therefrom. The cereal then passes through a heating section $e$ and an aspirating or drying section $f$ before being delivered through the hoppers $g$.

The intermediate aspirating or drying section $d$ of the machine can, when the character or condition of the cereal does not necessitate an intermediate drying treatment, be made to serve merely as a conduit for passing the cereal from the upper heating section $b$ to the lower heating section $e$, the passage of air currents through the aspirating section being discontinued and the sides $h$, $i$ of the directing shoots as shown in Figure 3 being turned to a vertical position so that the whole of the section is filled with wheat as shown at the left-hand side of Figure 3. When the section is so filled the wheat travels therethrough very slowly and the heat imparted thereto by the upper heating sections is able to penetrate the same uniformly. As shown at the right-hand side of Figure 3 the sides $h$, $i$ are at an angle to one another, and direct the cereal into the shoots beneath. Air for drying purposes is delivered at one side of each row of shoots as at $j$ and exhausted at the opposite side as at $k$.

The lower aspirating or drying section serves always for the drying of the cereal and is not convertible in the manner described with reference to the intermediate section $d$.

It will be understood that the heating sections are of known form and arrangement and I do not limit myself to any particular number of rows of heaters in each section, nor to any particular means or arrangement of conduits for exhausting such sections. Neither do I limit myself to any particular arrangement of the means whereby the cereal in the aspirating section is subjected to the action of air currents.

I claim:—

1. A drying and conditioning machine for cereals, particularly wheat, comprising at least four superposed alternate heating and aspirating or drying sections, as set forth.

2. In a drying and conditioning machine as claimed in claim 1, the arrangement whereby an intermediate aspirating or drying section can be allowed to fill completely with cereal passing from an upper to a lower heating section whilst the drying air currents are discontinued, as set forth.

In testimony whereof I have signed my name to this specification.

JAMES RAGLAND BIRCH.